(12) United States Patent
Hughes et al.

(10) Patent No.: US 7,630,295 B2
(45) Date of Patent: Dec. 8, 2009

(54) NETWORK DEVICE CONTINUITY

(75) Inventors: David Anthony Hughes, Mountain View, CA (US); Damon John Ennis, Mountain View, CA (US); Narayan Balasubramanian, Mountain View, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 687 days.

(21) Appl. No.: 11/263,755

(22) Filed: Oct. 31, 2005

(65) Prior Publication Data

US 2007/0097874 A1    May 3, 2007

(51) Int. Cl.
*H04J 1/16* (2006.01)
(52) U.S. Cl. ........................ 370/217; 370/221; 370/225; 370/401
(58) Field of Classification Search ........................ None
See application file for complete search history.

(56) References Cited

U.S. PATENT DOCUMENTS

| | | | |
|---|---|---|---|
| 7,120,666 B2 | 10/2006 | McCanne et al. | |
| 7,318,100 B2 * | 1/2008 | Demmer et al. | 709/229 |
| 2004/0117571 A1 | 6/2004 | Chang et al. | |
| 2004/0243571 A1 | 12/2004 | Judd | |
| 2006/0039354 A1 * | 2/2006 | Rao et al. | 370/352 |
| 2006/0117385 A1 * | 6/2006 | Mester et al. | 726/22 |
| 2006/0195547 A1 * | 8/2006 | Sundarrajan et al. | 709/217 |

OTHER PUBLICATIONS

Muthitacharoen, Athicha et al, "A Low-bandwidth Network File System," 2001, in Proc. of the 18th ACM Symposium on Operating Systems Principles, Banff, Canada, pp. 174-187.

* cited by examiner

*Primary Examiner*—Frank Duong
(74) *Attorney, Agent, or Firm*—Carr & Ferrell LLP

(57) ABSTRACT

A network device that ensures network continuity includes a processor and a communications interface. The processor determines whether the network device is functioning properly. The processor then generates a signal indicating whether the network device is functioning properly and transmits the signal to the communications interface. The communications interface is coupled to the processor and a policy based routing system. The communications interface processes the signal to activate or deactivate a link to the policy based routing system.

20 Claims, 5 Drawing Sheets

NETWORK DEVICE CONTINUITY

BACKGROUND

1. Technical Field

The present invention relates generally to network devices and more particularly to network device continuity.

2. Description of Related Art

One goal of communication networks is to have constant availability and accessibility of network devices such as servers and databases. When the operations of the network devices are mission critical, constant availability and accessibility becomes even more important. Unfortunately, the network devices do become unavailable for some period of time due to routine maintenance, hardware or software failures, or sub-standard performance.

In order to provide fault tolerance, some network devices are designed to handle these periods of unavailability. In one example, as soon as a network device becomes unavailable, the network device diverts traffic to a backup device or other available network devices. The switching of traffic to other network device should be automatic and immediate to ensure a transition transparent to the user or originating device.

FIG. 1 depicts an illustration of a communication network in a bridge configuration in the prior art. The computers 110, 120, 130 and the local area network (LAN) switch 140 form a LAN. The network device 150 is coupled between the LAN and the wide area network (WAN) router 160 and acts essentially as a bridge between the LAN and the WAN 170. In this example, the network device 150 includes a spring-loaded electromechanical mechanism 152 attached to the communication links 154 and 156. In a "fail-to-wire" scenario, when the network device 150 fails, the spring-loaded electromechanical mechanism 152 shuts the communication links 154 and 156 and the network device 150 behaves as a straight wire. One problem is when the network device 150 fails, the traffic between the LAN and the WAN 170 is interrupted while the network device 150 is replaced or corrected. Another problem is that some prior art "fail-to wire" network devices are in the Open System Interconnection (OSI) layer 2 and layer 3, which is a mixed solution that may be non-standard.

One problem with some network devices is that when there is a software error in the network device, the network device remains coupled to the communication network. For example, when a processor in the network device is in an infinite loop, the network device remains coupled to the communication network, and the communications continue to be sent to the network device from the communication network.

Other communication networks include policy based routers that route traffic based on policies set up by network administrators. One limitation of some of these policy based routers is that communication protocols and control of the policy based routers are proprietary to the manufacturer of the policy based routers. Thus, other network devices attached to the policy based routers cannot control routing through the policy based routers in a failure or maintenance scenario. One example of a communications protocol is Cisco Discovery Protocol from Cisco Systems, Inc. in San Jose, Calif. The communication protocols and control of the policy based routers may not be available to other vendors, or the policy based routers do not have the proper interfaces for control communications with other network devices. Furthermore, licensing the technology of the communication protocols and control may not be a cost effective solution.

SUMMARY OF THE INVENTION

The invention addresses the above problems by ensuring network continuity using a network device that includes a processor and a communications interface. The processor determines whether the network device is functioning properly. The processor then generates a signal indicating whether the network device is functioning properly and transmits the signal to the communications interface. The communications interface is coupled to the processor and a policy based routing system. The communications interface processes the signal to activate or deactivate a link to the policy based routing system.

The network device may include a timer that resets based on the signal and deactivates the link when the timer expires. The network device may also include an electromechanical mechanism that activates and deactivates the link. The communications interface may deactivate the link when the network device is powered down. The processor may determine whether software of the network device is working properly, whether hardware of the network device is working properly, and whether memory access of the network device is working properly. The communication interface may deactivate the link by creating an open circuit.

A method of operating a network device that ensures network continuity includes the steps of determining whether the network device is functioning properly and generating and transmitting a signal indicating whether the network device is functioning properly to a communications interface coupled to a policy based routing system. The method also includes the step of processing the signal in the communications interface to activate or deactivate a link to the policy based routing system.

When the network device does not perform properly such as when the network device is powered down or when there is a hardware or software error, the network device essentially unplugs itself from the policy based routing system. The policy based routing system may then detect that the network device is down and redirect or terminate traffic away from the network device.

DETAILED DESCRIPTION OF THE INVENTION

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A network device that ensures network continuity includes a processor and a communications interface. The processor determines whether the network device is functioning properly. The processor then generates a signal indicating whether the network device is functioning properly and transmits the signal to the communications interface. The communications interface is coupled to the processor and a policy based routing system. The communications interface processes the signal to activate or deactivate a link to the policy based routing system.

Thus, when the network device does not perform properly such as when the network device is powered down or when there is a hardware or software error, the network device essentially unplugs itself from the policy based routing system. The policy based routing system may then detect that the network device is down and redirect or terminate traffic away from the network device.

Figure 1:
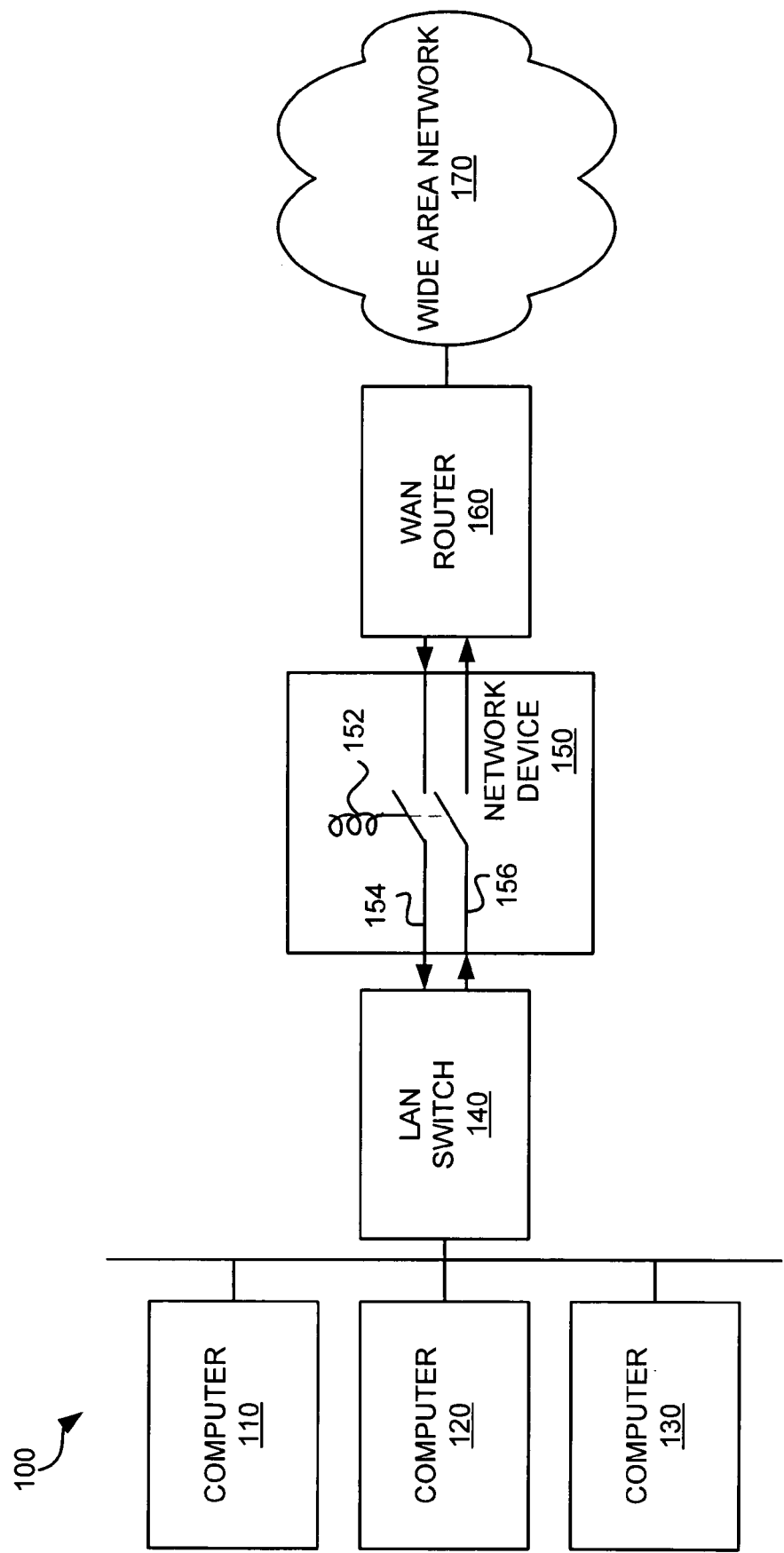
FIG. 1 is an illustration of a system with a network device in the prior art.
Figure 2:
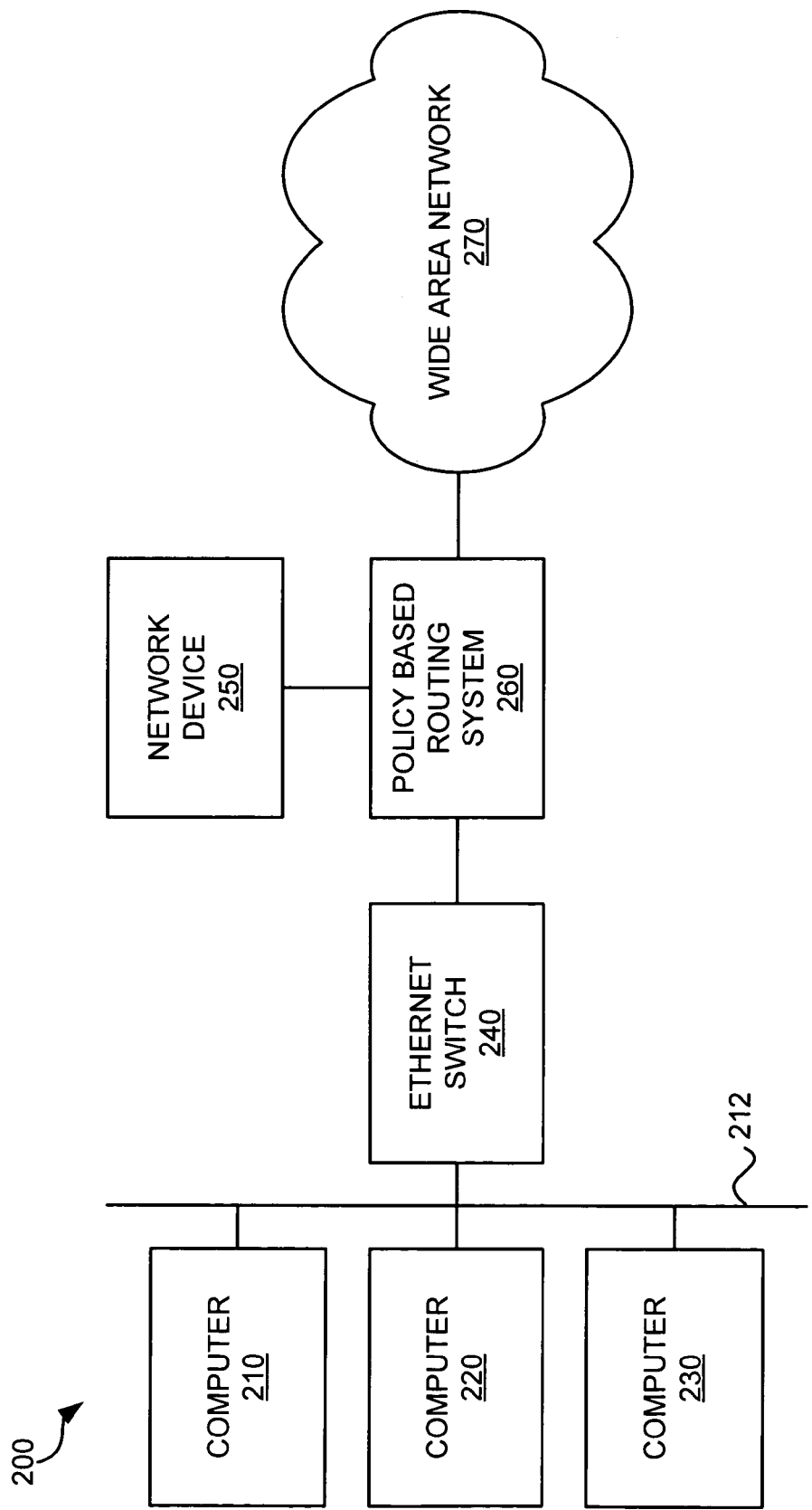
FIG. 2 is an illustration of a system with a network device and a policy based routing system in an exemplary implementation of the invention.

FIG. 2 depicts an illustration of a system 200 with a network device 250 and a policy based routing system 260 in an exemplary implementation of the invention. The system 200 includes computers 210, 220, 230, an Ethernet switch 240, the network device 250, the policy based routing system 260, and a wide area network (WAN) 270.

The computers 210, 220, 230 and the Ethernet switch 240 are coupled to a bus 212. The Ethernet switch 240 is coupled to the policy based routing system 260. The policy based routing system 260 is coupled to the network device 250 and the WAN 270.

In this example in FIG. 2, the computers 210, 220, and 230, the bus 212, and the Ethernet switch 240 form a local area network (LAN). In other embodiments, there are various processing systems, communication devices, and communications networks that could be coupled to the policy based routing system 260. For simplicity and exemplary purposes in FIG. 2, the policy based routing system 260 is located between the LAN and the WAN 270.

The policy based routing system 260 is any device or system configured to selectively route or forward packets or cells based on a policy. In some examples, network administrators set up policies to route or forward packets by quality of service, load balancing, application, identity of source or destination, and/or network availability. In other embodiments, any switching or routing systems can be used to route or forward packets or cells to the network device 250. These switching or routing systems are configured to detect when there is an open circuit to the network device 250. The switching or routing systems may detect that the port to the network device 250 is down when there is an open circuit in the network device 250. Once the switching or routing systems detect that the port is down, the switching or routing systems can redirect or forward traffic away from the network device 250. Similarly, the switching or routing systems may detect that the port to the network device 250 is up when there is a closed circuit in the network device 250. Once the switching or routing systems detect that the port is up, the switching or routing systems can redirect or forward traffic to the network device 250.

The network device 250 is any processing device or system that is coupled to the policy based routing system 260 and configured to process packets or cells. In this configuration, the network device 250 is a "one-armed router" because of the one connection to the policy based routing system 260. One example of the network device is the network memory appliance, which is described in U.S. application Ser. No. 11/202,697, filed Aug. 12, 2005 and entitled "Network Memory Architecture," which is hereby incorporated by reference.

When the network device 250 is functioning properly, the policy based routing system 260 routes some packets to the network device 250 and other packets directly between the LAN and the WAN 270 based on policies. When the network device 250 is not functioning properly, the policy based routing system 260 routes all packets directly between the LAN and the WAN 270.

Figure 3:
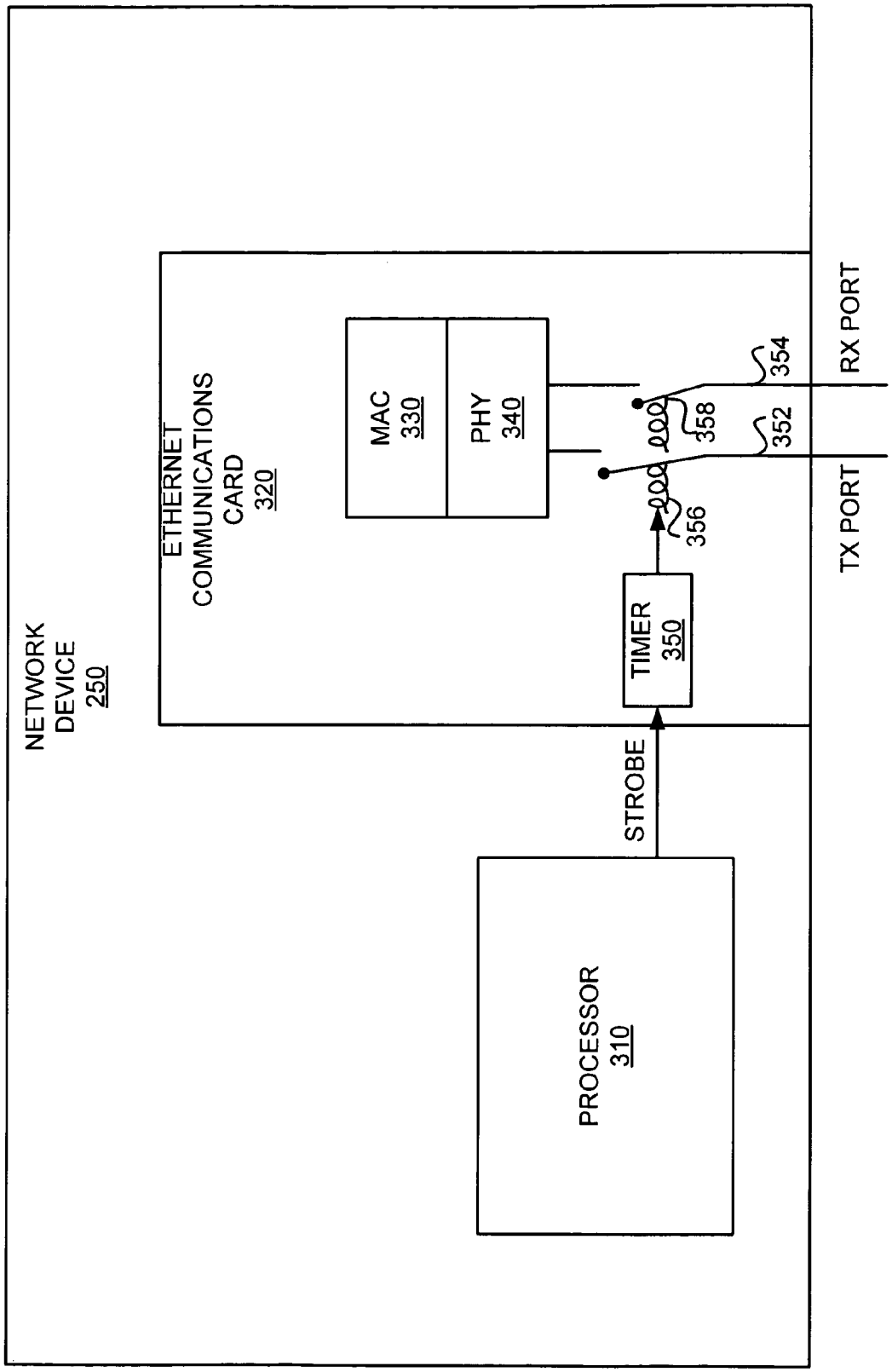
FIG. 3 is an illustration of a network device in an exemplary implementation of the invention.

FIG. 3 depicts an illustration of a network device 250 in an exemplary implementation of the invention. The network device 250 includes a processor 310 and an Ethernet communications card 320. The Ethernet communications card 320 includes a Media Access Control (MAC) interface 330, a physical layer (PHY) interface 340, a timer 350, a transmission link 352, a receiving link 354, a spring mechanism 356, and a spring mechanism 358. The transmission link 352 and the receiving link 354 may be differential in some embodiments.

The processor 310 is coupled to the timer 350. The timer 350 is operatively coupled to the spring mechanism 356 and the spring mechanism 358. The transmission link 352 is coupled to the PHY interface 340 and the spring mechanism 356. The spring mechanism 356 opens and closes a connection of the transmission link 352 to the PHY interface 340. Similarly, the spring mechanism 358 opens and closes a connection of the receiving link 354 to the PHY interface 340.

The processor 310 is any processing circuitry configured to determine whether the network device 250 is functioning properly, generate a signal indicating whether the network device 250 is functioning properly, and transmit the signal to a communications interface. One example of the processor 310 is a microprocessor. The operations of processor 310 are described in further detail below in FIG. 4.

The network device 250 functions properly when the network device 250 is powered on and the hardware and software operations and performance of the network device 250 are normal or within an acceptable range. The network device is not functioning properly when the network device 250 is powered down, a hardware or software error occurs, or the performance of the network device 250 is not optimal or unacceptable.

The signal is any hardware or software message, instruction, or signal that indicates whether the network device 250 is functioning properly. In this example in FIG. 3, the signal resets a timer in the Ethernet communications card 320.

The Ethernet communications card 320 is one example of a communication interface. The communication interface is any circuitry configured to perform communications and process the signal to activate or deactivate a link to the policy based routing system 260.

The timer 350 is any hardware circuitry or software configured to keep track of time. The spring mechanisms 356 and 358 are electro-mechanical mechanisms that are spring loaded to open and close connections. In this example, when the power in the network device 250 is off or the timer 350 has expired, the spring mechanisms 356 and 358 disconnect the transmission link 352 and the receiving link 354 to create an open circuit. This scenario is called "fail to open." The policy based routing system 260 then detects the open circuit from the network device 250 and redirects packets away from the network device 250.

In some embodiments, the network device 250 has a separate management port that is coupled with a separate connection to the Ethernet switch 240 for management purposes. When the network device 250 is in the fail to open scenario, the network device can still be managed through this separate connection. In some cases, the network device 250 has two separate IP addresses: one for management and the other for the communications port of the network device 250.

If the timer 350 has not expired, the spring mechanisms 356 and 358 cause the transmission link 352 and the receiving link 354 to be shut and consequently connect the Ethernet communications card 320 with the policy based routing system 260. Thus, the policy based routing system 260 can then route or forward packets to the network device 250.

The spring mechanisms 356 and 358 are examples of one electromechanical mechanism that opens and closes connection. Although two spring mechanisms 356 and 358 are shown in FIG. 3, other embodiments may include one or more mechanisms to open and close connections. There are numerous other electromechanical mechanisms and/or solid state mechanisms that can be used to open and close connections. Some other examples of electromechanical mechanisms are switches, levers, relays, buttons, and toggles.

Figure 4:
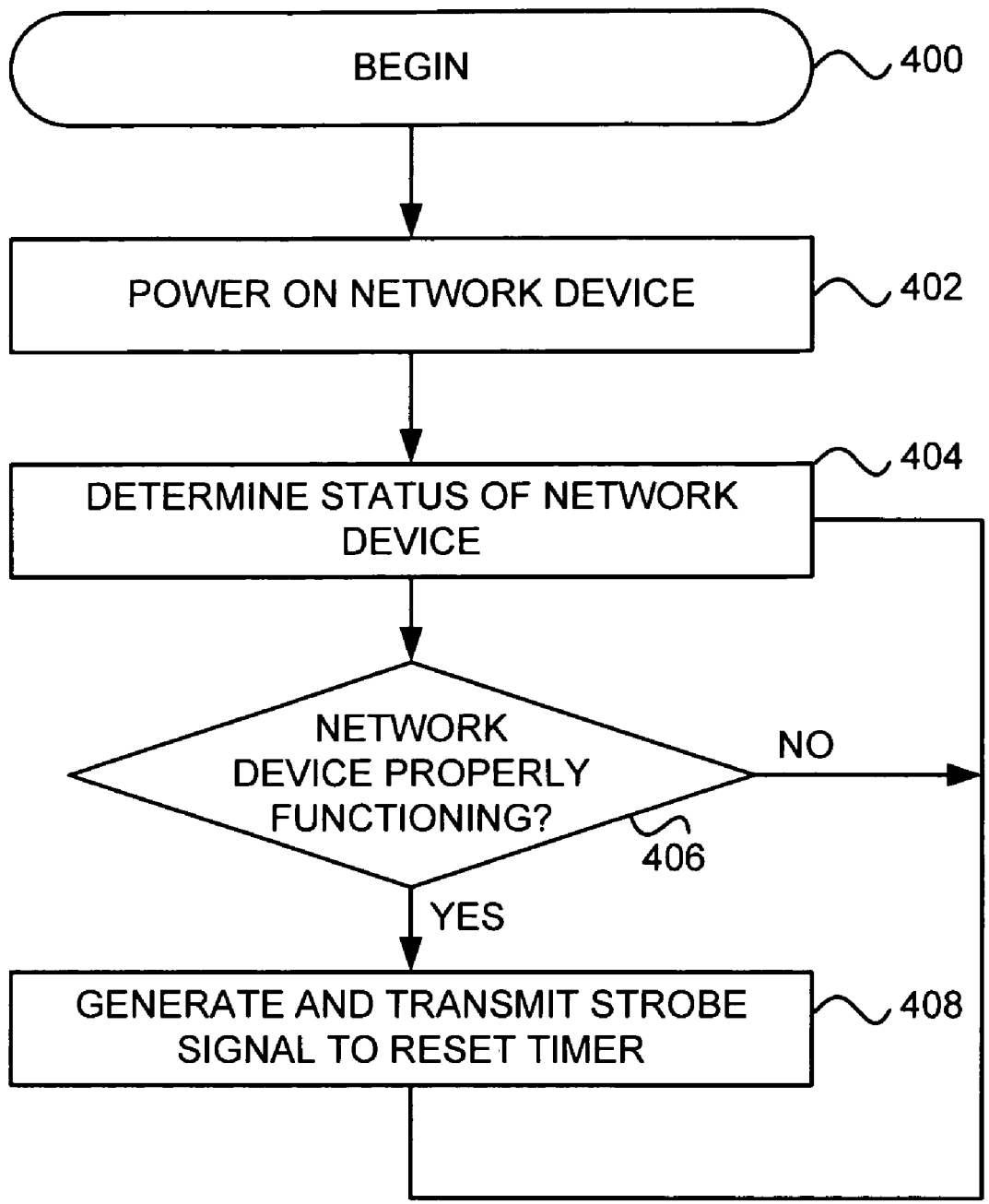
FIG. 4 is a flow chart for a processor in a network device in an exemplary implementation of the invention.

FIG. 4 depicts a flow chart for the network device 250 with the processor 310 in an exemplary implementation of the invention. FIG. 4 begins in step 400. In step 402, the network device 250 is powered on.

In step 404, the processor 310 determines the status of the network device 250. In step 406, the processor 310 then determines whether the network device 250 is properly functioning. In steps 404 and 406, the processor 310 is checking the internal health of the network device 250 periodically. In determining whether the network device 250 is functioning properly, the processor 310 may check whether a file can be opened, whether a process can be forked, whether there are memory leaks, whether no more memory is available, whether the processor 310 is stuck in an infinite loop, and any other hardware or software condition or situation that may cause the network device 250 to not perform optimally. In some embodiments, the processor 310 determines whether the network device 250 is properly functioning every N seconds, where N seconds is configurable. In some embodiments, N can be measured in milliseconds to provide continuous checking of the internal health of the network device 250.

If the network device 250 is not properly functioning, the network device 250 is unable to process steps 404 or 406, or the network device 250 fails at step 406, which would both cause the timer 350 to expire. By not sending a strobe signal to the timer 350, the timer 350 may expire causing the spring mechanisms 356 and 358 to create an open circuit on the transmission link 352 and the receiving link 354. The policy based routing system 260 then detects the open circuit and prevents routing or forwarding of the packets to the network device 250. The flow of packets to the network device 250 can then be advantageously re-routed away from the network device 250 when the network device is not functioning properly 250 due to hardware or software problems, conditions, or situations. In contrast, prior art policy based routers only reroute packets when a network device coupled to the policy based router has a power failure or complete hardware failure.

If the network device 250 is properly functioning, the processor 310 generates and transmits a strobe signal to reset the timer 350 in step 408 before returning to step 404. Resetting the timer 350 will ensure that the spring mechanisms 356 and 358 cause a closed circuit with the transmission link 356 and the receiving link 358 to connect the network device 250 to the policy based routing system 260.

Figure 5:
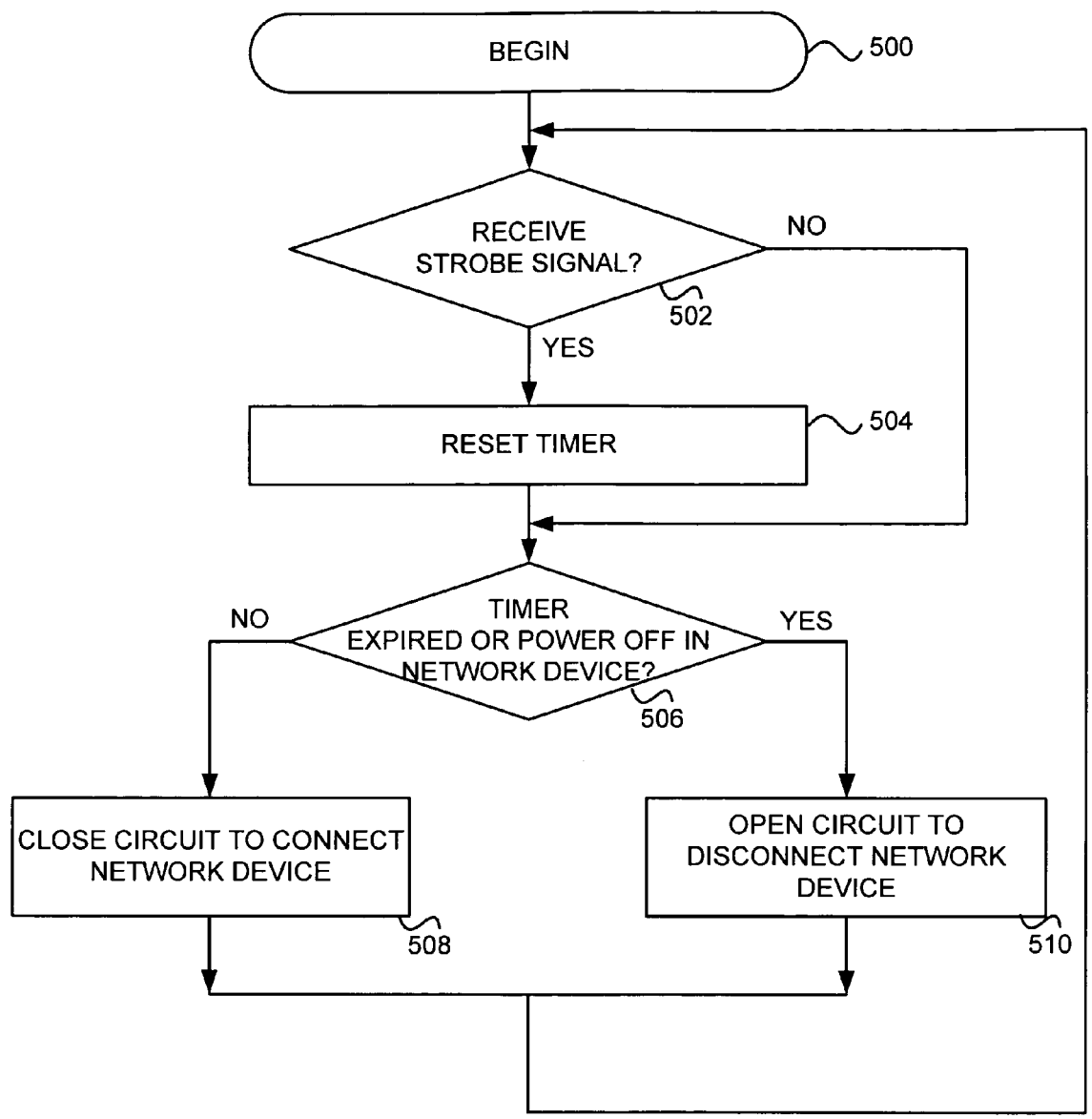
FIG. 5 is a flow chart for a communication interface in a network device in an exemplary implementation invention.

FIG. 5 depicts a flow chart for the Ethernet communication card 320 in an exemplary implementation of the invention.

FIG. 5 begins in step 500. In step 502, the timer 350 determines whether a strobe signal is received from the processor 310. If a strobe signal is received, the timer 350 resets in step 504. If no strobe signal is received, the process continues to step 506.

In step 506, the timer 350 is checked whether the time on the timer 350 has expired or whether the network device 250 is powered off. If the timer 350 has not expired and the power in the network device 250 is on, the spring mechanisms 356 and 358 are closed to connect the transmission link 352 and the receiving link 354, respectively, in step 508. If the timer 350 has expired or the power in the network device 250 is off, the spring mechanisms 356 and 358 are opened to disconnect the transmission link 352 and the receiving link 354, respectively, in step 510. The process then returns to step 502.

When the network device 250 is not functioning properly such as when the network device 250 is powered down or when there is a hardware or software error, the network device essentially unplugs itself from the policy based routing system 260. This prevents communications between the policy based routing system 260 and the inoperable network device 250. These embodiments provide a clean architecture in which the configuration and operations of the network device 250 changes without changing the configuration and operations of the policy based routing system 260.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A network device that ensures network continuity, the network device comprising:
 a processor configured to determine whether the network device is functioning properly, to generate a signal indicating whether the network device is functioning properly, and to transmit the signal; and
 a communications interface coupled with the processor and communicatively coupleable via a link in an out of path configuration with a policy based routing system positioned between a wide area network and a local area network, the communications interface configured to process the signal to activate and deactivate the link to the policy based routing system, wherein the network device is detected as an open circuit by the policy based routing system when the link is deactivated such that data packets transferred between the wide area network and the local area network are redirected away from the network device ensuring that data flow between the wide area network and the local area network is not disrupted during replacement and repair of the network device.

2. The network device of claim 1 wherein the communications interface further comprises a timer configured to reset based on the signal and deactivate the link when the timer expires.

3. The network device of claim 1 wherein the communications interface further comprises an electromechanical mechanism configured to activate and deactivate the link.

4. The network device of claim 1 wherein the communications interface is configured to deactivate the link when the network device is powered down.

5. The network device of claim 1 wherein the processor configured to determine whether software of the network device is working properly.

6. The network device of claim 1 wherein the processor configured to determine whether hardware of the network device is working properly.

7. The network device of claim 1 wherein the processor configured to determine whether memory access of the network device is working properly.

8. The network device of claim 1 wherein the policy based routing system is configured to route at least some of the data packets to the network device over the link.

9. The network device of claim 1 wherein the policy based routing system is configured to detect that the link is deactivated and route data packets away from the network device.

10. The network device of claim 1 wherein the communications interface is configured to deactivate the link by creating an open circuit.

11. A method of operating a network device that ensures network continuity, the method comprising:
    determining whether the network device is functioning properly;
    generating a signal indicating whether the network device is functioning properly;
    transmitting the signal to a communications interface communicatively coupled via a link in an out of path configuration with a policy based routing system positioned between a wide area network and a local area network; and
    processing the signal in the communications interface to activate and deactivate the link to the policy based routing system, wherein the network device is detected as an open circuit by the policy based routing system when the link is deactivated such that data packets transferred between the wide area network and the local area network are redirected away from the network device ensuring that data flow between the wide area network and the local area network is not disrupted during replacement and repair of the network device.

12. The method of claim 11 wherein the communication interface comprises a timer configured to reset based on the signal and deactivate the link when the timer expires.

13. The method of claim 11 wherein determining whether the network device is functioning properly comprises determining whether software of the network device is working properly.

14. The method of claim 11 wherein determining whether the network device is functioning properly comprises determining whether hardware of the network device is working properly.

15. The method of claim 11 wherein determining whether the network device is functioning properly comprises determining whether memory access of the network device is working properly.

16. The method of claim 11 further comprising routing at least some of the data packets from the policy based routing system to the network device over the link.

17. The method of claim 11 further comprising detecting that the link is deactivated and route data packets in the policy based router away from the network device.

18. The method of claim 11 wherein processing the signal in the communications interface to deactivate the link comprises creating an open circuit.

19. A computer readable storage medium having a program embodied thereon, the program executable by a processor for performing a method of operating a network device that ensures network continuity, the method comprising:
    determining whether the network device is functioning properly;
    generating a signal indicating whether the network device is functioning properly;
    transmitting the signal to a communications interface communicatively coupled via a link in an out of path configuration with a policy based routing system positioned between a wide area network and a local area network; and
    processing the signal in the communications interface to activate and deactivate the link to the policy based routing system, wherein the network device is detected as an open circuit by the policy based routing system when the link is deactivated such that data packets transferred between the wide area network and the local area network are redirected away from the network device ensuring that data flow between the wide area network and the local area network is not disrupted during replacement and repair of the network device.

20. The computer readable storage medium of claim 19, wherein the method further comprises routing at least some of the data packets from the policy based routing system to the network device over the link.

\* \* \* \* \*

UNITED STATES PATENT AND TRADEMARK OFFICE
CERTIFICATE OF CORRECTION

PATENT NO. : 7,630,295 B2  Page 1 of 1
APPLICATION NO. : 11/263755
DATED : December 8, 2009
INVENTOR(S) : Hughes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this

Second Day of November, 2010

David J. Kappos
*Director of the United States Patent and Trademark Office*